United States Patent [19]

Weber, Jr.

[11] Patent Number: 4,744,609
[45] Date of Patent: May 17, 1988

[54] FREIGHT BRAKE CONTROL VALVE HAVING AN EMERGENCY PISTON SLIDE VALVE AND GRADUATING VALVE ARRANGED TO PROVIDE AN ACCELERATED BRAKE APPLICATION FUNCTION

[75] Inventor: Charles L. Weber, Jr., North Huntingdon, Pa.

[73] Assignee: American Standard Inc., Wilmerding, Pa.

[21] Appl. No.: 930,480

[22] Filed: Nov. 14, 1986

[51] Int. Cl.$^4$ .......................... B60T 15/30; B60T 11/34
[52] U.S. Cl. ............................................. 303/37; 303/33
[58] Field of Search ....................... 303/33, 35, 36, 37, 303/38, 39, 69, 74

[56] References Cited

U.S. PATENT DOCUMENTS

| | | | |
|---|---|---|---|
| 2,012,375 | 8/1935 | Campbell | 303/69 |
| 2,939,746 | 6/1960 | Pickert | 303/33 |
| 4,536,040 | 8/1985 | Eder | 303/37 |

Primary Examiner—Andres Kashnikow
Assistant Examiner—Timothy Newholm
Attorney, Agent, or Firm—G. J. Falce

[57] ABSTRACT

A freight brake control valve device in which the emergency piston is arranged to operate a pair of slide valves having lost motion therebetween to provide a continuous, local reduction in the brake pipe pressure in response to initial actuation of the emergency piston when a service rate of brake pipe pressure reduction is made, in order to quickly propagate a brake pipe pressure reduction wave along the train and accordingly provide an accelerated application of the train brakes. This accelerated application function in response to a service rate of brake pipe pressure reduction is achieved during movement of the emergency piston toward emergency position, during which movement, the quick-action chamber "breathing" function also occurs, the latter being presently incorporated in the emergency piston slide valve to stabilize the emergency piston following initial actuation thereof, so as to prevent further actuation of the emergency piston to emergency position.

9 Claims, 2 Drawing Sheets

FREIGHT BRAKE CONTROL VALVE HAVING AN EMERGENCY PISTON SLIDE VALVE AND GRADUATING VALVE ARRANGED TO PROVIDE AN ACCELERATED BRAKE APPLICATION FUNCTION

BACKGROUND OF THE INVENTION

The present standard, A.A.R. approved, ABDW Freight Brake Control Valve manufactured by Westinghouse Air Brake Company includes an accelerated application valve portion that is mounted on the valve emergency portion and operates in response to the quick-action chamber "breathing" pressure developed by the emergency piston during service brake applications. Quick-action chamber "breathing" is necessary during service brake applications in order to stabilize the emergency piston against undesired emergency operation. This quick-action chamber "breathing" pressure is utilized to pilot the accelerated application valve which, in turn, operates to effect a local, quick service reduction of brake pipe pressure in a cyclic manner during service brake applications to thereby supplement the trainline reduction of brake pipe pressure at each car of the train.

It will be appreciated, therefore, that operation of the accelerated application valve is predicated on movement of the emergency piston to a position in which the quick-action chamber pressure on one side of the piston is vented to atmosphere, and thus reduced at a rate corresponding to a service rate of reduction of the brake pipe pressure effective on the other side of the piston, thereby preventing the emergency piston from being moved further to an emergency application position.

It will be further appreciated that this emergency piston includes a slide valve via which the quick-action chamber pressure venting or "breathing" connection is established. In addition to providing the quick-action chamber "breathing" function, the emergency piston slide valve also provides for piloting the vent valve to obtain quick-action emergency. It is well known that slide valve construction, while having a long maintenance-free service life, is somewhat more expensive than other valve-type constructions. However, multiple valve control functions can be incorporated in a relatively small valve device to offset the initial expense of construction.

In copending application, Ser. No. 853,519, now U.S. Pat. No. 4,690,463, there is disclosed a slide valve arrangement for incorporating the accelerated application valve function in the emergency piston. It will be appreciated, however, that one characteristic of slide valve operation is that the first function to occur in one direction of movement is the last function to occur during movement in the opposite direction. Therefore, in order that the accelerated application venting of brake pipe pressure be terminated prior to terminating the venting of quick-action chamber pressure to assure that the accelerated application is not perpetuated, the accelerated application venting of brake pipe pressure is initiated after the venting of quick-action chamber pressure. Accordingly, the accelerated application function is not positive in its operation, since relatively light brake pipe pressure reductions may be counteracted by the venting of quick-action chamber pressure before the emergency piston has moved sufficiently to effect the accelerated application function.

SUMMARY OF THE INVENTION

It is, therefore, an object of the present invention to provide a simplified freight brake control valve device in which the accelerated application valve function is incorporated in the already existing emergency piston slide valve.

A further object of the invention is to achieve a more positive control of the emergency piston movement to assure termination of the accelerated application function following a service brake application, without reducing the efficiency of the accelerated application function.

A still further object of the invention is to eliminate the accelerated application valve portion of the standard ABDW freight control valve device in order to provide a cost and weight reduction.

Briefly, these objectives are accomplished by modifying the present ABD type freight brake control valve emergency portion to provide, in the face of the emergency piston slide valve, a groove via which additional ports provided in the slide valve seat are interconnected during normal "breathing" action of the emergency piston. This "breathing" action of the emergency piston occurs in response to movement of the piston to a position in which quick-action chamber pressure on one side thereof is vented to atmosphere at a rate which prevents a service rate of brake pipe reduction effective on the other side from creating a sufficient pressure differential to actuate the piston to emergency application position, thus stabilizing the emergency piston against undesired emergency during service brake applications.

The additional ports in the slide valve seat, when communicated via the aforementioned groove in the slide valve, establish a local exhaust of brake pipe pressure at each car of a train to supplement the trainline brake pipe reduction and thereby accelerate the propagation of the brake pipe reduction along the train.

A graduating slide valve is associated with the emergency piston slide valve in order to provide a sequencing operation in which the normal timing of the opening and closing of the respective ports is reversed with respect to movement of the emergency piston between accelerated application and release positions, thereby assuring more positive control of the accelerated application function.

By incorporating this accelerated application function in the already existing emergency piston slide valve, the separate accelerated application valve portion presently employed on ABDW type freight brake control valves can be eliminated and its function carried out by the emergency piston, with only minor modification thereof. Accordingly, a weight savings can be realized, as well as an attendant cost savings.

BRIEF EXPLANATION OF THE DRAWINGS

These and other objects and attendant advantages will become apparent from the following more detailed explanation when taken in accordance with the accompanying drawings, wherein.

DESCRIPTION AND OPERATION

Figure 1:
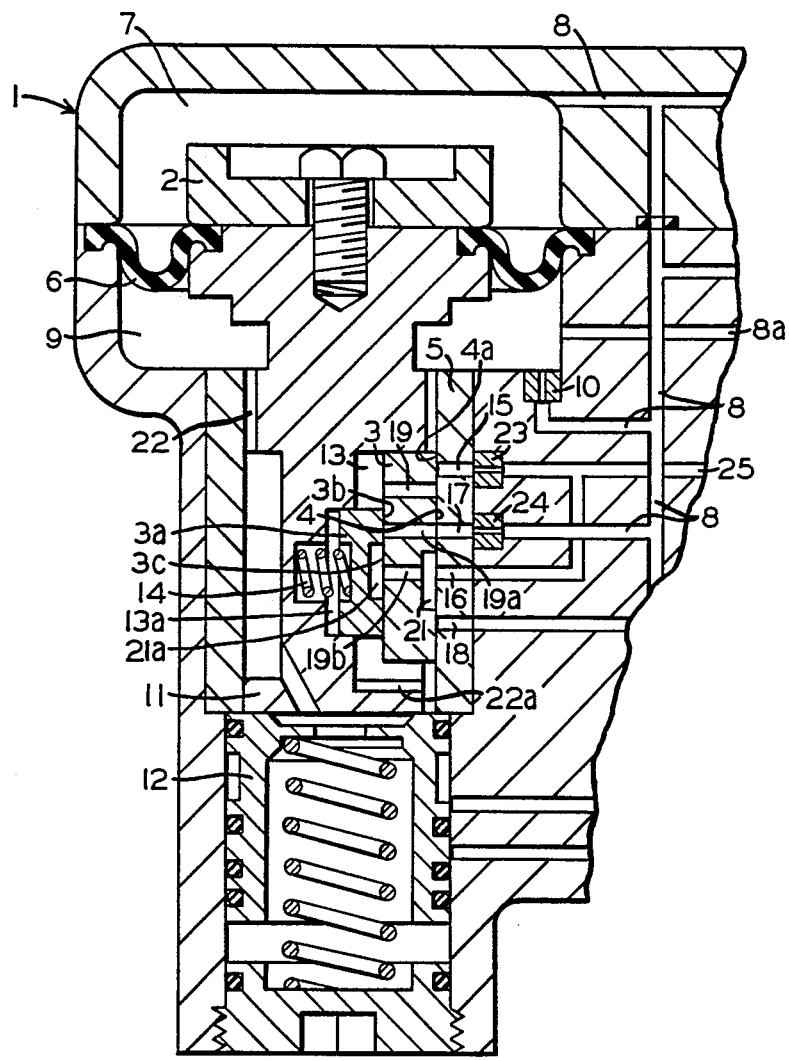
FIG. 1 is a diagrammatic view, in section, showing the emergency piston of a conventional ABD type freight brake control valve device in its release and charging position and the emergency piston main slide valve cooperatively arranged with a graduating slide valve.

Referring to FIG. 1 of the drawings, there is shown incorporated in the emergency portion 1 of a conventional freight brake control valve device, such as the ABD freight brake control valve manufactured by Westinghouse Air Brake Company, an emergency piston 2 having a main slide valve 3, one planar face 4 of which engages the conforming seat 4a in a slide valve bushing 5. A diaphragm 6 of piston 2 forms, with the valve body, a chamber 7 on one side, to which the compressed air carried in the trainline brake pipe (not shown) is connected via a brake pipe branch passage 8, and a chamber 9 on the opposite side subject to the compressed air in a quick-action chamber (not shown). The quick-action chamber pressure is charged from brake pipe branch passage 8 via a choke 10, chamber 9, and a passage 8a, so that, during brake pipe charging, the pressure in chamber 7 is greater than the pressure in chamber 9, and the effective force due to this pressure differential acting across the area of the piston establishes and maintains the piston in its lower-most release position (as shown) until such time as the brake pipe pressure is reduced. This release position is determined by engagement of the emergency piston tail 11 with a spring-loaded spool valve 12 that provides the well-known emergency accelerated release function, which is not a part of the present invention.

The emergency piston main slide valve 3 is housed within a recess 13 in the emergency piston, the axial dimension of recess 13 being greater than that of main slide valve 3, so that the main slide valve is moved axially by piston 2 with lost motion therebetween. A graduating slide valve 3a is carried fast in a further recess 13a of piston 2 so that a planar face 3b of the graduating valve engages a conforming face 3c of main slide valve 3. The respective faces of the main slide valve, slide valve seat and graduating slide valve are lapped to provide an effective metal-to-metal seal therebetween. A spring 14 in recess 13a between the body of piston 2 and graduating slide valve 3a urges the adjoining faces of the main slide valve, slide valve seat and graduating valve together with sufficient force that the lapped interfaces therebetween provide a pressure seal between the passageways therein.

There are four such passageways 15, 16, 17, and 18 in the bushing 5, three passageways 19, 19a and 19b in main slide valve 3, in addition to a groove 21 that is formed in the face 4 of slide valve 3, and a groove 21a that is formed in the face 3b of graduating slide valve 3a.

A passage 22 in piston 2 connects quick-action chamber air in chamber 9 to recess 13, 13a, wherefrom this quick-action chamber air is connected to the main slide valve/seat interface via passageway 19 and also via a fluted passageway 22a formed along the one side of recess 13 adjacent the side of main slide valve 3. Passageway 15 contains a quick-action chamber breather choke 23, and passageway 17 contains an accelerated application choke 24, the latter being smaller in size than the former for a purpose hereinafter discussed. Passageways 15 and 16 are interconnected in the valve body with a passageway 25 that is vented to atmosphere. Passageway 17 is connected to passage 8, while passageway 18 is connected to auxiliary valve devices (not shown) which initiate and propagate the emergency application of the train brakes.

In the release position shown in FIG. 1, the opening of passageway 19 at the slide valve/seat interface lies intermediate passageways 15 and 17, so that the slide valve interrupts fluid pressure communication between these passageways. Similarly, groove 21 in main slide valve 3 covers the opening of passageway 16 in bushing 5, so that the main slide valve/seat interface interrupts fluid pressure communication between passageway 16 and each of passageway 17 and 18 adjacent thereto. Also, the opening of passageway 18 is covered by face 4 of slide valve 3 to isolate passageway 18 from fluid pressure communication with recess 13, 13a. Also, slide valve passage 19 is open at face 3c to recess 13, while passageway 19a is blanked by graduating valve 3a at the graudating slide valve/main slide valve interface, and passageway 19b is blanked by the graduating valve groove 21a.

During a selective service rate of reduction of the pressure carried in the trainline brake pipe, as is well known, the service portion (not shown) of the ABD control valve device effects a service brake application, while concurrently, the brake pipe pressure reduction is registered in chamber 7 via passage 8. Due to the fact that choke 10 prevents the quick-action chamber pressure effective in chamber 9 from reducing at the same rate as the pressure reduction effective at chamber 7, a pressure differential is established across piston 2 to force the emergency piston in an upward direction from release position toward emergency application position.

A well known function of the emergency piston during service brake applications is to establish a venting or "breathing" of quick-action chamber pressure in response to movement of emergency piston 2 toward emergency application position. Accordingly, the pressure effective in chamber 9 is reduced at a rate sufficient to counteract a service rate of brake pipe reduction effective in chamber 7, thereby stabilizing the emergency piston against further movement to emergency application position. In accordance with the present invention, a further function of the emergency piston is to provide an accelerated application of the brakes in response to this controlled movement of the emergency piston during a service brake application.

Figure 2:
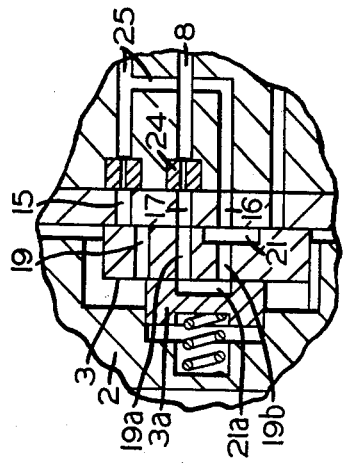
FIG. 2 is an enlarged, fragmentary view of the emergency piston main slide valve and graduating slide valve of the present invention shown in a preliminary service position.

Initial upward movement of piston 2 from the release position shown in FIG. 1 to the preliminary service position shown in FIG. 2, in response to a selective service rate of reduction of brake pipe pressure, occurs without piston 2 effecting movement of main slide valve 3, due to the initial space between piston recess 13 and the main slide valve. This lost motion between piston 2 and main slide valve 3 allows the graduating valve 3a to be shifted upwardly by piston 2 relative to main slide valve 3, whereby groove 21a establishes a first fluid pressure flow path in which slide valve passageways 19a and 19b are communicated. Accordingly, brake pipe pressure in passageway 8 is vented via choke 24, seat passage 17, passage 19a, groove 21a, passage 19b, groove 21, passage 16, and passage 25. This initiates a local reduction of brake pipe pressure to supplement the trainline brake pipe pressure reduction prior to the quick-action chamber "breathing" function occurring, since passageway 19 remains cut off from passageway 15 leading to vent passage 25 until such time as slide valve 3 is shifted from its position shown in FIGS. 1 and 2. The purpose in initiating a local reduction of brake pipe pressure prior to occurrence of the aforementioned quick-action chamber "breathing" function is to effect positive movement of the emergency piston upwardly toward emergency application position in response to even light reductions of brake pipe pressure, thereby assuring that an accelerated application of the brakes is achieved.

Figure 3:
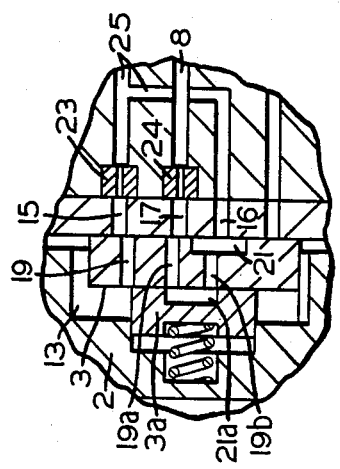
FIG. 3 is an enlarged, fragmentary view of the emergency piston, main slide valve and graduating slide valve of the present invention shown in an intermediate service position.

As this local reduction of brake pipe pressure occurs, the differential pressure between chambers 7 and 9 acting across piston 2 thus tends to increase, encouraging continued upward movement of piston 2 from the preliminary service position shown in FIG. 2 to an intermediate service position, as shown in FIG. 3. In this position, an intermediate stage of accelerated application exists in which passage 15 in bushing 5 is cracked open to passage 19, as main slide valve 3 is shifted upwardly by piston 2 together with graduating slide valve 3a, thereby initiating the venting of quick-action chamber pressure effective in chamber 9 via passage 22, recess 13, passageways 19 and 15, choke 23, and passage 25. At this point, maximum venting of brake pipe pressure is occurring via choke 24 and the flow path established via main slide valve 3 and graduating slide valve 3a, while the venting of quick-action chamber pressure is minimal due to the restricted flow communication afforded by the cracked opening between passageways 19 and 15. Consequently, an upward-acting pressure differential continues to develop across piston 2, to thereby assure continued upward movement of the piston.

Figure 4:
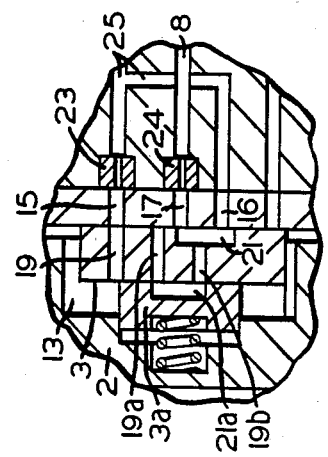
FIG. 4 is an enlarged, fragmentary view of the emergency piston, main slide valve and graduating slide valve of the present invention shown in a maximum service position.
Figure 5:
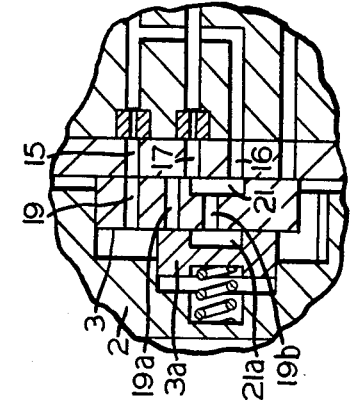
FIG. 5 is an enlarged fragmentary view of the emergency piston, main slide valve and graduating slide valve of the present invention shown in a preliminary release position.

As shown in FIG. 4, movement of main slide valve 3 and graduating slide valve 3a with piston 2 provides a second fluid flow path between seat passages 16 and 17 via slide valve groove 21 in bypass of groove 21a, for a purpose hereinafter explained, while concurrently, passages 15 and 19 are brought into full communication, this latter communication constituting a third fluid flow path. In this maximum accelerated application position, full flow communication is established via the respective porting of the connected passageways of the third flow path. Choke 24 in passage 8 is thus employed to establish the maximum amount of brake pipe fluid under pressure that is vented locally to supplement the trainline reduction of brake pipe pressure, while choke 23 in passage 25 establishes the venting or "breathing" of quick-action chamber pressure at a maximum level. Choke 23 is selected such that this maximum "breathing" of quick-action chamber pressure causes the pressure in chamber 9 to blowdown faster than the pressure effective in chamber 7, thereby reversing the pressure differential between chambers 7 and 9. Accordingly, continued upward movement of piston 2 is halted before reaching the emergency application position shown in FIG. 6, to provide service stability. Moreover, the reversal of the pressure differential between chambers 7 and 9 initiates a downward movement of piston 2, which initially occurs without effecting movement of slide valve 3, due to the space between the main slide valve and piston 2 at the upper side of recess 13. Since graduating valve 3a is fast with piston recess 13a, the graduating valve is shifted downwardly relative to the slide valve such that groove 21a interrupts communication between slide valve ports 19a and 19b, as shown in FIG. 5. This establishes a preliminary cut-off of the local brake pipe venting, thereby leaving slide valve groove 21 as the lone flow path connection via which continued local exhaust of brake pipe pressure is controlled. Upon engagement of piston 2 with slide valve 3, as shown in FIG. 5, further downward deflection of piston 2 will result in the flow area of the connection between groove 21 and seat passage 17 being reduced, so that the local exhaust of brake pipe pressure is accordingly reduced. Concurrently, the flow area of the connection between passages 19 and 15 at the slide valve/seat interface is also reduced until the piston finds a steady state position in its downward travel between preliminary cut-off position (FIG. 5) and release position (FIG. 1) in which the effective pressure in chamber 7 resulting from the continuing local venting of brake pipe pressure is counterbalanced by the effective reduction of quick-action chamber pressure effective in chamber 9. This establishes the amount of continuing exhaust of brake pipe pressure locally, that is, supplementary to the selective reduction of trainline brake pipe pressure, for a given rate of reduction of brake pipe pressure during service braking, thereby providing an accelerated application of brakes. This action will continue as long as the selective trainline reduction of brake pipe pressure continues.

The rate of reduction of brake pipe pressure that can normally occur during a service brake application varies over a fairly wide range, depending upon, for example, the train length, the position of a given car in the train, and the amount of brake pipe leakage that exists. This range of service rates is accounted for by the emergency piston assuming different "steady state" positions in which the consequent size of the port opening between passages 15 and 19 at the slide valve/seat interface changes to establish a rate of quick-action chamber pressure "breathing" which matches or balances the existing brake pipe pressure reduction.

The size of choke 24 via which the local exhaust of brake pipe pressure occurs is selected so that, when the trainline brake pipe pressure reduction is terminated, the local exhaust of brake pipe pressure effective in chamber 7 is insufficient to balance the continuing reduction of quick-action chamber pressure effective in chamber 9. The consequent pressure differential across piston 2 will force the piston downwardly from its steady state position toward release position. It will be appreciated now that, during this further downward deflection of piston 2, the slide valve groove 21 connecting passages 16 and 17 is moved out of communication therewith prior to the flow connection between passagess 15 and 19 being cut off at the main slide valve/seat interface. Since graduating valve groove 21a had already interrupted flow communication via passages 19a and 19b, as shown in the preliminary cut-off position of FIG. 5, local brake pipe pressure is cut off from exhaust prior to the exhaust of quick-action chamber pressure being terminated. This final exhaust of quick-action chamber pressure reinforces the downward acting pressure differential across piston 2, thereby assuring a positive and complete movement of piston 2 to release position, as shown in FIG. 1, to terminate the accelerated application function.

Figure 6:
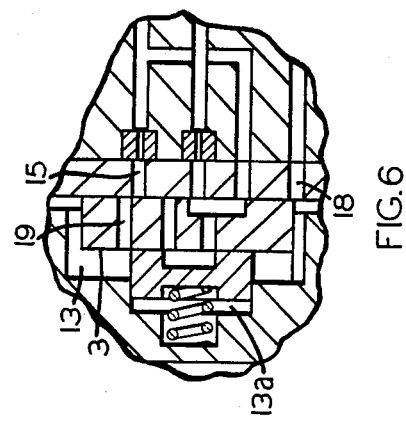
FIG. 6 is an enlarged, fragmentary view of the emergency piston, main slide valve and graduating slide valve of the present invention shown in emergency position.

Returning now to FIG. 4, showing the emergency piston 2 in its maximum accelerated application position in which maximum venting of brake pipe pressure and quick-action chamber pressure is established, it will be understood that, in the event the trainline brake pipe reduction exceeds a service rate, the "breathing" or venting of quick-action chamber pressure via choke 23 will be insufficient to reverse the upward acting pressure differential across piston 2. Thus, instead of piston 2 moving back toward a steady state position, as shown in FIG. 5, as previously discussed with respect to a service brake application, the effective pressure differential will maintain continued upward movement of the piston to emergency position, as shown in FIG. 6. In this position, passage 19 is cut off from passage 15 at the main slide valve/seat interface to terminate the quick-action chamber breathing function, while concurrently the lower end of slide valve 3 uncovers passage 18 to connect quick-action chamber pressure from recess 13, 13a to a vent valve device (not shown), for piloting an emergency brake application in a well-known manner.

In accordance with the foregoing, it will be understood that the accelerated brake application function is accomplished more reliably than heretofore, by reason of the fact that positive emergency piston operation is encouraged in both the application and release directions. The main slide valve/graduating valve arrangement with lost motion therebetween makes it possible to achieve linear control functions in a different sequence than normal. Normally, the first control function to operate during movement in one direction is the last control function to operate during movement in the opposite direction and vice versa. In accordance with the present invention, this control sequence is reversed. That is, brake pipe pressure is exhausted prior to exhausting quick-action chamber pressure during piston movement toward application position, but during piston movement in the opposite direction toward release position, the exhaust of brake pipe pressure is terminated prior to the exhaust of quick-action chamber pressure being terminated. Thus, the initial exhaust of brake pipe pressure prior to the exhaust of quick-action chamber pressure tends to increase the pressure differential across piston 2 in the direction of movement toward application position thereby achieving positive piston operation without the liklihood of piston stalling to achieve the accelerated application function. Moreover, during piston movement toward release position, the exhaust of brake pipe pressure is terminated prior to terminating the exhaust of quick-action chamber pressure, thereby tending to increase the pressure differential across piston 2 in the direction of movement thereof, i.e., toward release position. Again, this has the effect of achieving more positive piston movement to assure termination of the local brake pipe reduction and thereby prevents any possibility of the local brake pipe reduction sustaining the brake application following termination of the selective trainline brake pipe pressure reduction.

I claim:

1. For use on each car of a railway train having a brake pipe charged with fluid under pressure interconnected to the brake pipe of an adjoining car, a control valve device operable in response to selective service and emergency rates of reduction of the pressure carried in said brake pipe for effecting either a service or an emergency brake application, said control valve device comprising:

(a) a housing having a cavity therein;
    (b) an emergency piston in said cavity forming therewith first and second pressure chambers;
    (c) passage means interposed between said brake pipe and said first and second chambers via which said first and second chambers are charged with the fluid pressure carried in said brake pipe;
    (d) first choke means for restricting the flow of fluid pressure between said brake pipe and said second chamber;
    (e) slide valve means carried in said piston for effecting a further reduction of said brake pipe fluid pressure in addition to said selective reduction of said brake pipe fluid pressure upon initial movement of said piston in one direction when a pressure differential is established between said first and second chambers in response to said selective reduction of said brake pipe fluid pressure and thereafter effecting a reduction of the fluid pressure effective in said second chamber in bypass of said first choke means to such extent as to counterbalance the reduction of fluid pressure in said first chamber when said selective reduction of said brake pipe fluid pressure is at said service rate, thereby preventing further movement of said piston in said one direction, and for terminating said further reduction of fluid pressure only upon movement of said piston in a direction opposite said one direction subsequent to termination of said selective reduction of the fluid pressure carried in said brake pipe;
    (f) a recess in said piston; and
    (g) said slide valve means including:
        (i) a first slide valve carried within said recess, said first slide valve having an axial dimension less than the axial dimension of said recess so that during initial movement of said piston in said one and said opposite directions, lost motion occurs between said piston and said first slide valve and thereafter said first slide valve is moved with said piston; and
        (ii) a second slide valve carried fast in said recess for continuous movement therewith whereby relative movement occurs between said first and second slide valves during said initial movement of said piston, said first and second slide valves being cooperatively arranged to provide a first fluid flow path therebetween via which said further reduction of said brake pipe fluid pressure is established during said initial movement of said piston in said one direction and via which said further reduction of said brake pipe fluid pressure is interrupted during said initial movement of said piston in said opposite direction.

2. A control valve device as recited in claim 1, further comprising:

(a) a bushing in said cavity providing a valve seat with which said first slide valve coacts to establish a second fluid flow path therebetween via which said further reduction of said brake pipe fluid pressure is established following said initial movement of said piston in said one direction and via which said further reduction of said brake pipe fluid pressure is interrupted following said initial movement of said piston in said opposite direction.

3. A control valve device as recited in claim 2, wherein said first slide valve and said bushing provide a third fluid flow path via which venting of said second chamber is established following said initial movement of said piston in said one direction and via which said venting is interrupted following said initial movement of said piston in said opposite direction.

4. A control valve device as recited in claim 3, further characterized in that following said initial movement of said piston in said opposite direction, said interruption of said further reduction of said brake pipe fluid pressure via said second fluid flow path occurs prior to said interruption of said venting of said second chamber via said third fluid flow path.

5. A control valve device as recited in claim 4, wherein said movement of said piston in said one direction occurs in response to said selective reduction of said brake pipe fluid under pressure and said further reduction thereof. .

6. A control valve device as recited in claim 4, wherein said movement of said piston in said opposite direction occurs in response to an increase in said brake pipe fluid under pressure.

7. A control valve device as recited in claim 5, further comprising:
 (a) second choke means for establishing a maximum rate at which said further reduction of said brake pipe fluid pressure is effected; and
 (b) third choke means for establishing a maximum rate of reduction of fluid pressure in said second chamber in accordance with said predetermined rate of reduction of said brake pipe fluid pressure effective in said first chamber, the relationship between said second and third choke means being such that, upon termination of said selective reduction of said brake pipe fluid pressure, a fluid pressure differential is established between said first and second chambers to effect movement of said piston in said opposite direction.

8. A control valve device as recited in claim 7, further comprising:
 (a) a passage via which fluid pressure communication is established between said cavity and said second chamber, said recess in said piston being in communication with said cavity;
 (b) said first slide valve further coacting with said valve seat of said bushing to establish a fourth fluid flow path only in response to said movement of said piston in said one direction following said initial movement thereof when said reduction of said brake pipe fluid pressure exceeds a rate corresponding to said service rate.

9. A control valve device as recited in claim 8, wherein fluid flow via said first, second and third fluid flow paths is interrupted when said fourth fluid flow path is established.

* * * * *